March 25, 1930.    E. W. SEEGER    1,752,032

SYSTEM OF POWER TRANSMISSION AND DISTRIBUTION

Filed July 13, 1928

INVENTOR
Edwin W. Seeger.
BY
ATTORNEY

Patented Mar. 25, 1930

1,752,032

UNITED STATES PATENT OFFICE

EDWIN W. SEEGER, OF WAUWATOSA, WISCONSIN, ASSIGNOR, BY MESNE ASSIGNMENTS, TO CUTLER-HAMMER, INC., OF MILWAUKEE, WISCONSIN, A CORPORATION OF DELAWARE

SYSTEM OF POWER TRANSMISSION AND DISTRIBUTION

Application filed July 13, 1928. Serial No. 292,484.

This invention relates to improvements in systems of power transmission and distribution and is especially applicable to alternating current systems wherein synchronous motor-generators are employed for converting alternating current into direct current.

In such systems, as in mine service, the motor-generators operate much of the time at less than full load near unity power factor whereas other devices suppled by the system have a lagging power factor with the result that the power factor of the system as a whole is frequently very uneconomical. The power supplied by the motor-generators is, in mine service, used largely for haulage, the motor-generators being arranged at intervals along the line, with the result that the load on the individual motor-generator varies widely according to the position of the locomotives supplied thereby. As will be understood, when a locomotive is operating directly adjacent the point at which the motor-generator supplies power to the trolley wire, the load on the motor-generator is at a maximum and is greatly reduced as the locomotive approaches another of the motor-generator stations.

The present invention has among its objects to improve the average power factor of such systems and more particularly to accomplish such improvement through the medium of the motor-generators while operating under reduced load conditions.

Other objects and advantages of the invention will hereinafter appear.

The accompanying drawing illustrates one embodiment of the invention which will now be described it being understood that the invention is capable of embodiment in other forms without departing from the scope of the appended claims.

In the drawing,

Fig. 1 is a diagrammatic view of the system while,

Figure 1:
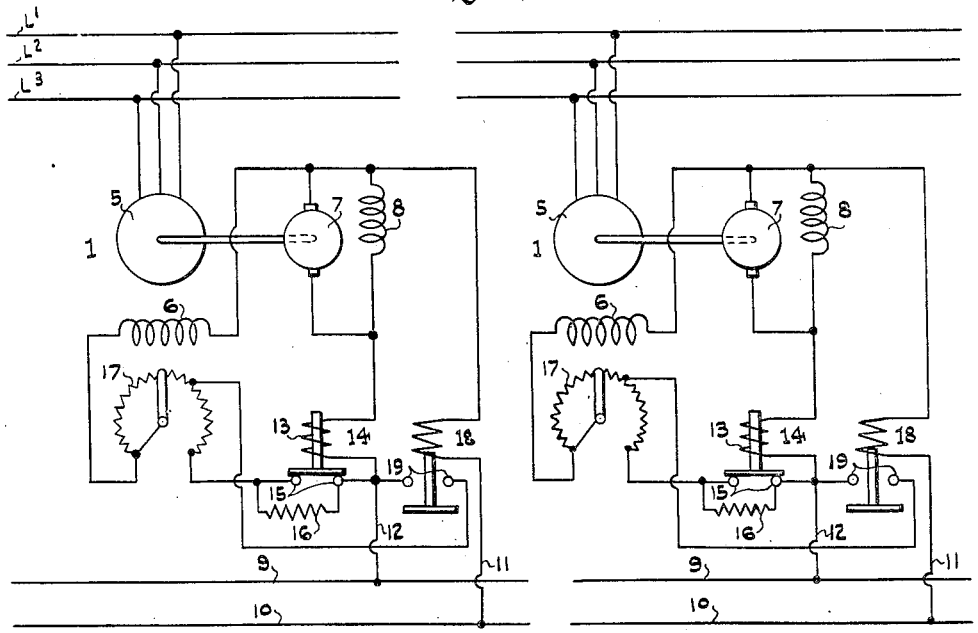

In the drawing, 1 and 2 are synchronous motor-generators to be installed at some distance apart in the system. The lines $L^1$, $L^2$ and $L^3$ are adapted to supply three phase alternating current to the motor-generators. The two machines and their control means are alike and the following description will suffice for both. 5 is the armature of the synchronous motor of the motor-generator 1. 6 is the field of the synchronous motor. 7 is the armature and 8 the field of the direct current generator of the motor-generator 1, said armature being coupled with the armature 5 by means of a shaft. The generator armature 7 supplies power to the direct current lines 9 and 10 through the wires 11 and 12. This direct current flows through the winding 13 of a relay 14, which is provided with contacts 15 adapted to control a resistance 16 in series with the field 6. A second resistance 17 adjustable by means of the lever 18 is connected in the circuit of the field winding 6 for permanent adjustment of the current through the field.

Figure 2:
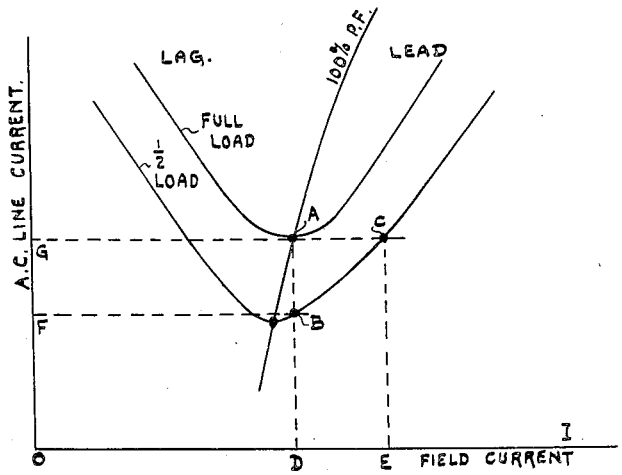
Figure 2 depicts certain characteristics of the motor-generators.

Figure 2 depicts the variations between the field current and the armature current of a synchronous motor. If the synchronous motor carries full load corresponding to OG and is so excited that its power factor is 100%, the value of the exciting current is equal to OD. If, now, the load drops to say one-half the excitation being kept constant, the load current is slightly leading and is equal to OF. This current is greatly below the current which the armature of the motor can safely carry. If, however, at half-load the excitation is increased to the value OE the armature current is thereby again increased to OG and is strongly leading.

In order to regulate automatically the change in excitation of the armature current of the synchronous motor relay 14 is adjusted so that when the direct current drawn from the generator 7 falls to a given value, say, one-half load, its armature drops thereby short-circuiting the resistance 16 and strengthening the field of the synchronous motor so as to cause the latter to take an increased but leading current from the alternating current line.

It is of course obvious that the current value at which relay 14 responds may be adjusted to adapt its operation to the particular requirements of the system and that a number of similar relays adjusted to respond at different current values in the armature 7 might be employed to control a multiplicity of resistances in the field winding 6 to thereby regulate the field strength 6 in a series of steps in accordance with the operating conditions.

It is further obvious that the field excitation current of the synchronous motor may be varied so that the alternating current at low load is higher or lower than the current at full load and that the relay may be adjusted to various load currents on the direct current side.

If for any reason it should be desirable to produce a lagging current with decreasing load this could also be accomplished by reversing the action of the relay or relays so that they would cut resistance into the field circuit of the synchronous motor with decreasing armature current.

In some cases the load on the direct current line may fluctuate very rapidly thereby causing undesirable rapid fluctuations on the alternating current line in which case the relay 14 may be provided with a retarding device such as a dash pot so that its response is delayed and it only acts if the change in the load continues for an appreciable time.

With the control illustrated a sudden increase in load on the generator such that the full load current of the machine is exceeded, might possibly result in the motor being pulled out of step due to weakening of its field by response of relay 14. Accordingly it may in practice be desirable to render the relay ineffective under such conditions. For this purpose there is illustrated a relay 18 having normally disengaged contacts 19 and having a winding in series in direct current circuit, said relay 18 being so calibrated as to respond to heavy currents above the normal operating current to short-circuit resistance 16 and a part of resistance 17 if desired.

What I claim as new and desire to secure by Letters Patent is:

1. In combination, an alternating current system, a synchronous rotary transformer supplied from said system and delivering direct current, means responsive to variations in load on the direct current side to vary the excitation of said transformer on its alternating current side for regulation of the power factor of the alternating current system, said means tending to reduce the excitation of said transformer under heavy load conditions on the direct current side and means to render the former means ineffective to so function when the load on the direct current side exceeds a given value.

2. The combination with an alternating current system, of a plurality of synchronous rotary transformers supplied with alternating current from said system and supplying direct current and separate regulating means for said transformers, the regulating means for each transformer including means responsive upon a decrease in direct current load to effect an increase in the excitation on the alternating current side of the transformer for power factor regulation and further including means to effect an increase in the excitation of the alternating current side of the transformer when the direct current load exceeds a given value.

3. The combination with an alternating current system, of a synchronous motor-generator supplied therefrom and delivering direct current, a resistance for the field circuit of the motor of said motor-generator, and a relay responsive to variations in the direct current load on said motor-generator to control said resistance, for operation of said motor-generator with power factor near unity at full load and with a substantial lead in power factor upon operation of said relay in response to a reduction in direct current load.

4. The combination with an alternating current system, of a synchronous dynamo electric machine, supplied with current from said system, field regulating means for said machine for varying the power factor of the alternating current system, said means tending to reduce the field excitation of said machine under heavy load conditions, and means to render the former means ineffective to so function when the load exceeds a given value.

5. The combination with an alternating current system, of a plurality of synchronous dynamo electric machines supplied with current from said system and separate field regulating means for said machines, the regulating means for each machine including means responsive upon decrease of the load of said machine to effect an increase in its excitation for power factor regulation and further including means to effect an increase in the excitation when the load exceeds a given value.

In witness whereof, I have hereunto subscribed my name.

EDWIN W. SEEGER.